(No Model.)

W. A. BOLE.

COMBINED PULLEY OR CRANK DISK AND SHAFT.

No. 314,789. Patented Mar. 31, 1885.

Witnesses:
J. Snowden Bell.
C. M. Clarke.

Inventor.
William A. Bole,
by George H. Christy
Atty.

N. PETERS, Photo-Lithographer, Washington, D. C.

UNITED STATES PATENT OFFICE.

WILLIAM A. BOLE, OF PITTSBURG, PENNSYLVANIA.

COMBINED PULLEY OR CRANK-DISK AND SHAFT.

SPECIFICATION forming part of Letters Patent No. 314,789, dated March 31, 1885.

Application filed February 17, 1885. (No model.)

*To all whom it may concern:*

Be it known that I, WILLIAM A. BOLE, a citizen of the United States, residing at Pittsburg, in the county of Allegheny and State of Pennsylvania, have invented or discovered a certain new and useful Improvement in Combined Pulley or Crank-Disk and Shaft, of which improvement the following is a specification.

Figure 1:
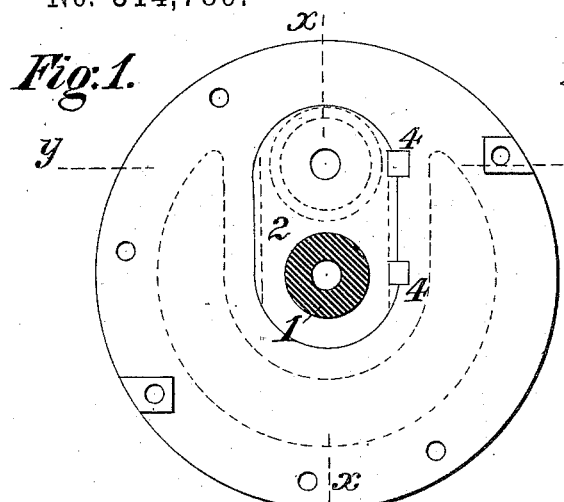
Figure 2:
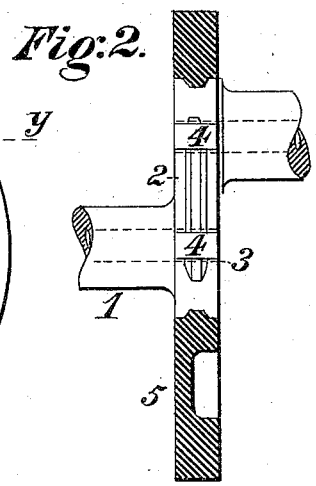
Figure 3:
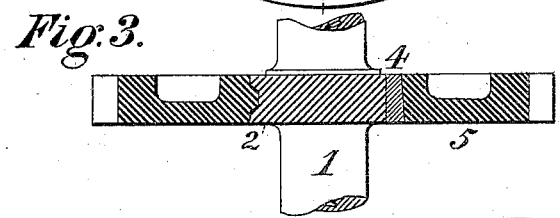
Figure 4:
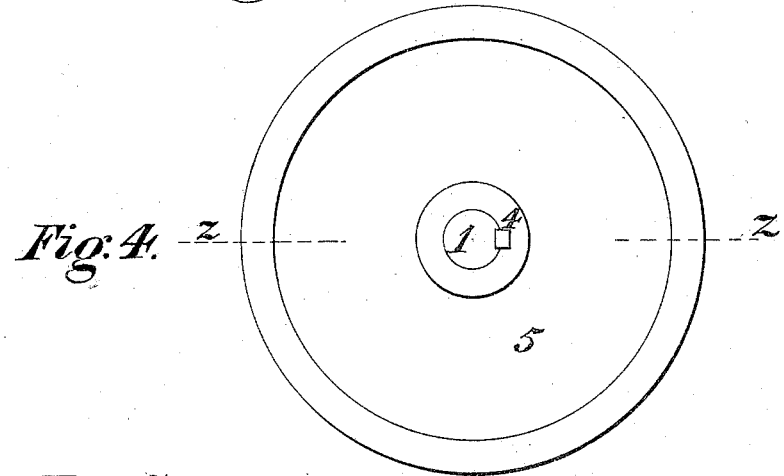
Figure 5:
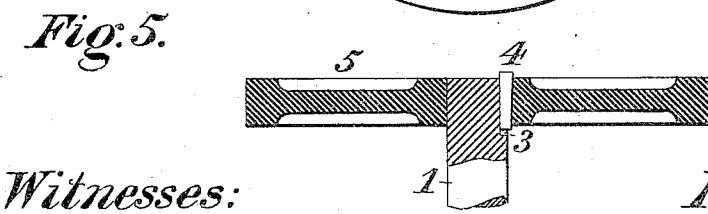

In the accompanying drawings, which make part of this specification, Figure 1 is an end view of a crank-disk and crank embodying my invention; Fig. 2, a sectional elevation at the line $x\ x$ of Fig. 1; Fig. 3, a section at the line $y\ y$ of Fig. 1; Fig. 4, an end view of a pulley fixed upon a shaft in accordance with my invention, and Fig. 5 a transverse section at the line $z\ z$ of Fig. 4.

In an application for Letters Patent filed by me December 16, 1884, Serial No. 150,485, I have described and claimed a method of securing a crank-disk or pulley to a shaft by casting the same upon and around the shaft and around the outer side of a loose adjustable key fitting longitudinally therein, and thereafter tightening said key.

My present invention relates to a combined pulley or crank-disk and shaft, the members of which are connected in the manner described in my application aforesaid; and the improvement consists in the combination of a shaft or a crank-arm thereon, having a key fitting freely in a longitudinal recess in its periphery, and a pulley or crank-disk cast upon and around said shaft or crank and key, as hereinafter more fully set forth.

In the practice of my invention a longitudinal recess or keyway, 3, of which there may be one or more, as desired, is cast or otherwise formed in the periphery of the shaft 1, (or of the crank-arm 2 of said shaft, as the case may be,) to which the pulley, crank-disk, balance-wheel, or other analogous member is to be attached, said recess being substantially parallel with the axial line of the shaft, and, if upon the crank-arm, extending preferably from one face thereof to the opposite face. A key, 4, corresponding in width with and of about the same length as the keyway, and tapered or inclined from one end to the other, is fitted with the capacity of longitudinal movement in the keyway, the key projecting above the keyway throughout its length to engage the casting subsequently to be formed. The shaft with the inserted key or keys is next set in proper position in molding-sand, in which by the use of a suitable pattern a mold is formed. The disk or pulley 5 is then cast in said mold, completely surrounding the periphery of the crank or shaft and projecting portion of the key or keys. After the solidification and contraction of the cast metal the key is driven tightly to a bearing, and any looseness which might otherwise result from the contraction of the casting will be effectually prevented. The inconvenience and expense of fitting the key to the disk is thus obviated, and the draft of the key on the disk is exerted against a surface with which the key is accurately in correspondence.

I am aware that a disk connected to a crank by being cast thereon, and a disk or pulley connected to a shaft by being keyed thereto, as also an expansible split sleeve cast around a removable core, which acts as the support for a key and a dividing-piece, were known at the date of my invention, and such, therefore, I distinctly disclaim.

My invention differs from the construction last referred to in the essential particular that I combine, in the connection of the crank or shaft and disk, a shrink fit, due to the contraction of the casting, with a wedging fit effected by the draft of the key upon a continuous body of metal, while in the former case the connection of the sleeve and shaft is effected only by the action of the key against clamping-bands applied subsequently to the casting of the sleeve, and no attachment by contraction of the metal is contemplated or obtainable.

I claim herein as my invention—

The combination of a shaft having a longitudinal keyway in its body or in a crank-arm thereon, a key fitting in said keyway with the capacity of longitudinal movement therein, and a continuous disk cast upon and encircling said shaft and key, substantially as set forth.

In testimony whereof I have hereunto set my hand.

WILLIAM A. BOLE.

Witnesses:
J. SNOWDEN BELL,
R. H. WHITTLESEY.